US011965833B2

(12) United States Patent
Hou et al.

(10) Patent No.: US 11,965,833 B2
(45) Date of Patent: Apr. 23, 2024

(54) DETECTION DEVICE

(71) Applicants:HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Jing-Zhi Hou, Zhengzhou (CN); Lin-Hui Cheng, Shenzhen (CN); Yan-Chao Ma, Zhengzhou (CN); Jin-Cai Zhou, Zhengzhou (CN); Zi-Long Ma, Zhengzhou (CN); Neng-Neng Zhang, Zhengzhou (CN); Yi Chen, Zhengzhou (CN); Chen-Xi Tang, Zhengzhou (CN); Meng Lu, Zhengzhou (CN); Peng Zhou, Zhengzhou (CN); Ling-Hui Zhang, Zhengzhou (CN); Lu-Hui Fan, Zhengzhou (CN); Shi-Gang Xu, Zhengzhou (CN); Cheng-Yi Chao, New Taipei (TW); Liang-Yi Lu, New Taipei (TW)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 792 days.

(21) Appl. No.: 17/105,566

(22) Filed: Nov. 26, 2020

(65) Prior Publication Data

US 2022/0099586 A1    Mar. 31, 2022

(30) Foreign Application Priority Data

Sep. 25, 2020 (CN) ......................... 202022137269.8

(51) Int. Cl.
*G01N 21/88* (2006.01)
*G05B 19/418* (2006.01)

(52) U.S. Cl.
CPC ....... *G01N 21/88* (2013.01); *G05B 19/41875* (2013.01); *G05B 2219/32218* (2013.01)

(58) Field of Classification Search
CPC .............. G01N 21/88; G01N 21/8806; G05B 19/41875; G05B 2219/32218; Y02P 90/02; B65G 15/12
See application file for complete search history.

(56) References Cited

U.S. PATENT DOCUMENTS 4,857,260 A * 8/1989 Schoenig, Jr. ........... G21C 3/10
                                                    976/DIG. 282
9,434,040 B2 * 9/2016 Bao ..................... B23Q 16/001
(Continued)

FOREIGN PATENT DOCUMENTS

CN    208758930 U  *  4/2019  ............ B23P 19/001
CN    109939946 A  *  6/2019
(Continued)

*Primary Examiner* — Gene O Crawford
*Assistant Examiner* — Abby A Jorgensen
(74) *Attorney, Agent, or Firm* — ScienBiziP, P.C.

(57) ABSTRACT

A detection device includes a frame, a transport mechanism, detection mechanisms, and a grasping mechanism. The transport mechanism includes a feeding line, a first flow line, and a second flow line arranged in parallel on the frame. The detection mechanisms are arranged on the frame and located on two sides of the transport mechanism. The grasping mechanism is arranged on the frame and used to transport workpieces on the feeding line to the detection mechanisms, transport qualified workpieces to the first flow line, and transport unqualified workpieces to the second flow line.

15 Claims, 11 Drawing Sheets

(56) References Cited

U.S. PATENT DOCUMENTS

| | | | | |
|---|---|---|---|---|
| 2005/0000379 A1* | 1/2005 | Hranica | ............ | G05B 19/41875 |
| | | | | 101/484 |
| 2013/0096711 A1* | 4/2013 | Gates | ...................... | B65B 19/32 |
| | | | | 700/110 |
| 2014/0267680 A1* | 9/2014 | Hsu | ..................... | G01N 27/9026 |
| | | | | 348/86 |
| 2015/0066187 A1* | 3/2015 | Berg | ................. | A61F 13/15772 |
| | | | | 700/109 |
| 2019/0143482 A1* | 5/2019 | Iwata | ................... | G01N 23/207 |
| | | | | 72/16.3 |

FOREIGN PATENT DOCUMENTS

| | | | | | |
|---|---|---|---|---|---|
| CN | 210411602 | U | * | 4/2020 | |
| CN | 211109878 | U | * | 7/2020 | |
| CN | 211939808 | U | * | 11/2020 | |
| CN | 113000305 | A | * | 6/2021 | |
| DE | 102016122725 | A1 | * | 5/2018 | ............. B65B 57/08 |
| JP | 2020155629 | A | * | 9/2020 | ....... H01L 21/67288 |
| WO | WO-2017199959 | A1 | * | 11/2017 | ................ B24C 1/10 |
| WO | WO-2018094680 | A1 | * | 5/2018 | ............. B65G 47/91 |
| WO | WO-2018095581 | A1 | * | 5/2018 | ............. B65B 57/08 |
| WO | WO-2018211879 | A1 | * | 11/2018 | ................ B24C 1/10 |
| WO | WO-2020037342 | A1 | * | 2/2020 | ......... B29C 45/1808 |
| WO | WO-2020049515 | A1 | * | 3/2020 | ............. C23C 2/003 |

\* cited by examiner

DETECTION DEVICE

FIELD

The subject matter herein generally relates to a detection device for inspecting workpieces.

BACKGROUND

Generally, each workpiece in a factory needs to be tested before being sent to a next station for assembly. However, the workpieces are usually inspected manually, which processes may not be efficient and may be labor intensive

BRIEF DESCRIPTION OF THE DRAWINGS

Implementations of the present disclosure will now be described, by way of embodiments, with reference to the attached figures.

DETAILED DESCRIPTION

Figure 1:
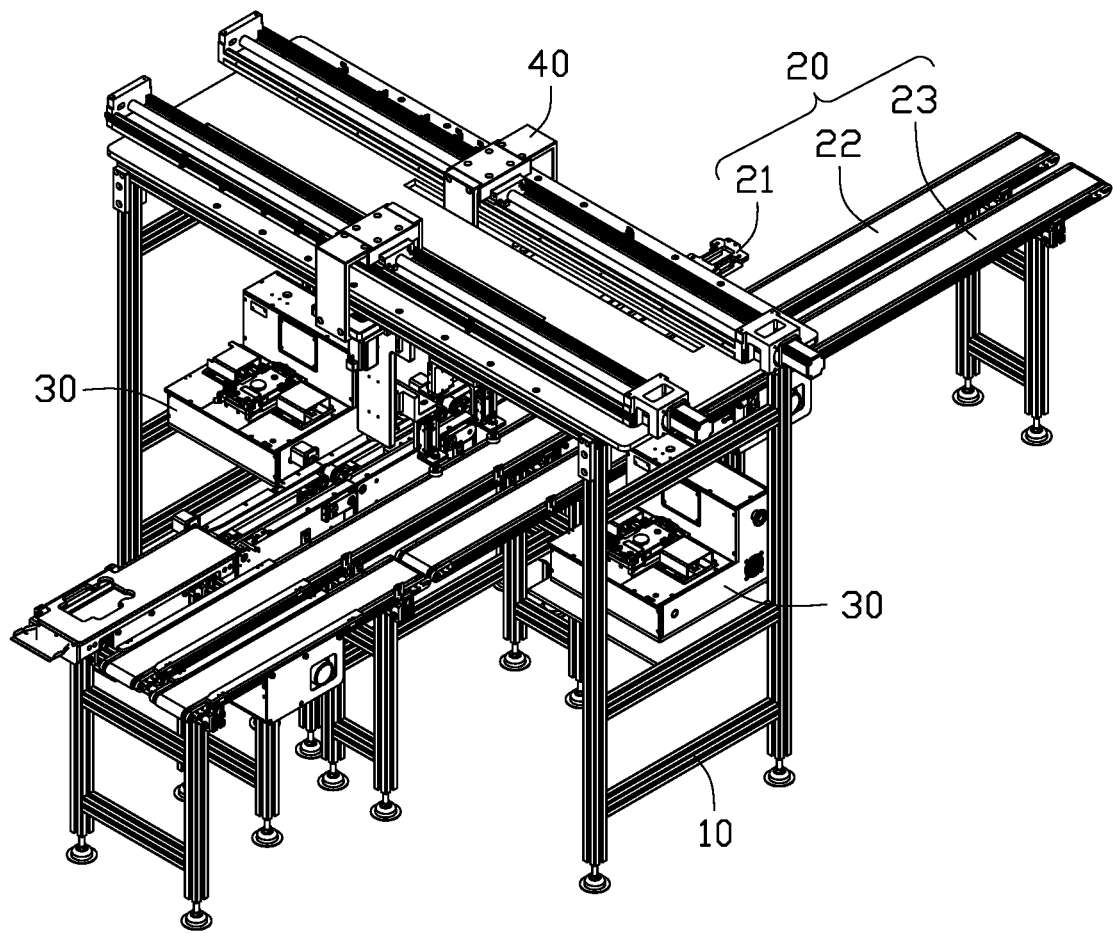
FIG. 1 is a perspective schematic diagram of a detection device according to an embodiment.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

Referring to FIG. 1, a detection device 100 includes a frame 10, a transport mechanism 20, a plurality of detection mechanisms 30, and a grasping mechanism 40. The transport mechanism 20 includes a feeding line 21, a first flow line 22, and a second flow line 23 arranged in parallel on the frame 10. The plurality of detection mechanisms 30 is provided on the frame 10 and located on two sides of the transport mechanism 20. The grasping mechanism 40 is provided on the frame 10 and used for transporting workpieces on the feeding line 21 to the plurality of detection mechanisms 30, transporting qualified workpieces to the first flow line 22, and transporting unqualified workpieces to the second flow line 23.

In one embodiment, there are two detection mechanisms 30 symmetrically arranged on two sides of the transport mechanism 20, respectively. There is one grasping mechanism 40 located above the two detection mechanisms 30 and the transport mechanism 20 and used for grasping the workpiece on the feeding line 21 and transporting the workpiece to the detection mechanisms 30, and then grasping and transporting the qualified workpiece to the first flow line 22 to be transported to a next station or grasping and transporting the unqualified workpiece to the second flow line 23 to be returned back to a starting point for repair.

In another embodiment, in order to inspect multiple workpieces at the same time, a plurality of detection mechanisms 30 and a plurality of grasping mechanisms 40 are provided. The plurality of detection mechanisms 30 are symmetrically arranged on two sides of the transport mechanism 20, and the plurality of grasping mechanisms 40 are arranged side-by-side on the detection mechanisms 30 and the transport mechanism 20, and each of the grasping mechanisms 40 is located on each group of detection mechanisms 30. When multiple workpieces need to be inspected at the same time, multiple workpieces are placed on the feeding line 21, and the plurality of grasping mechanisms 40 grabs the workpieces and transports the workpieces to the corresponding inspection mechanism 30, and the qualified or unqualified workpieces are transported to the first flow line 22 or the second flow line 23 to improve efficiency.

Referring to FIG. 1, the frame 10 is used to support the transport mechanism 20, the detection mechanisms 30, and the grabbing mechanism 40.

Figure 2:
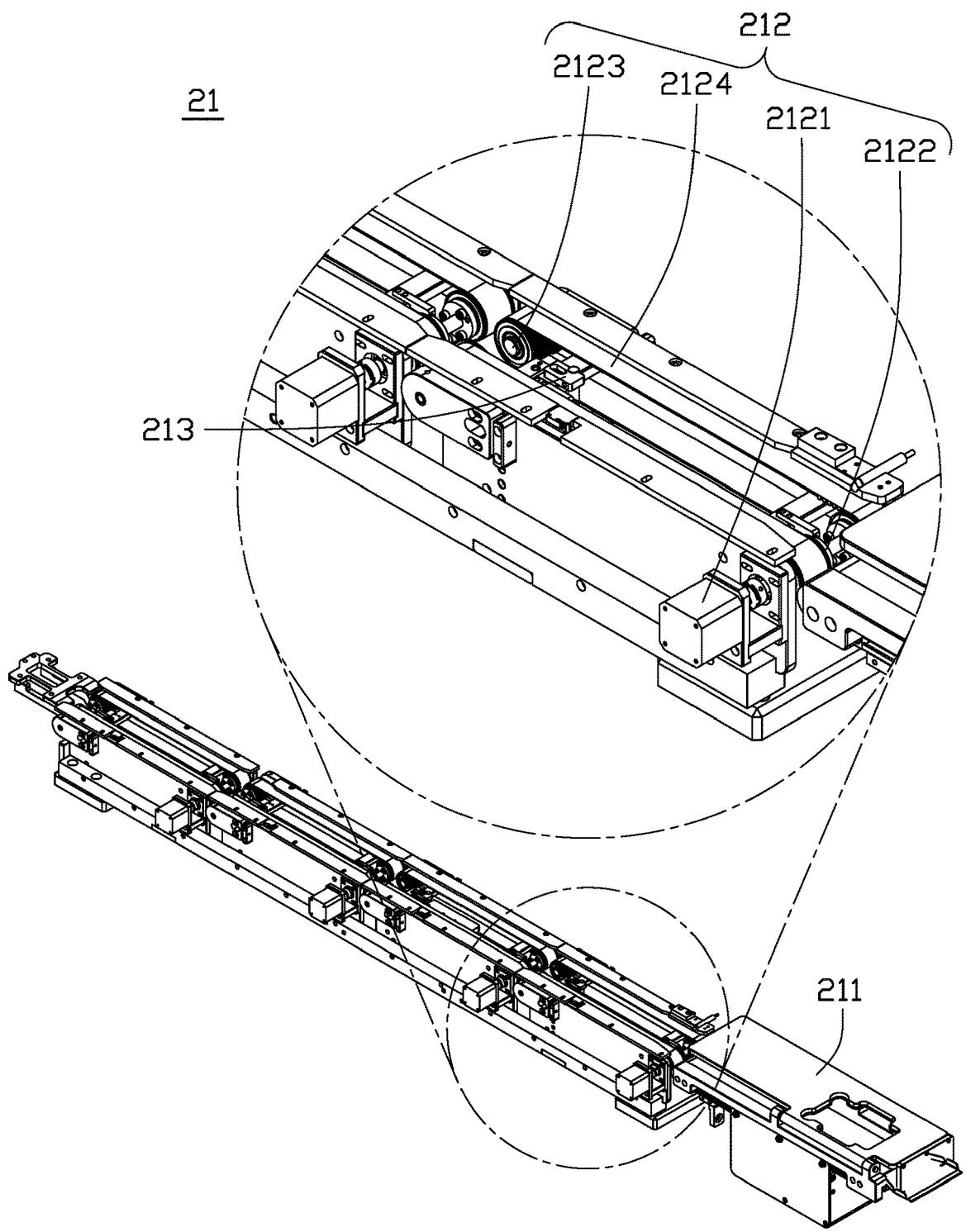
FIG. 2 is a perspective schematic diagram of a feeding line shown in FIG. 1.

Referring to FIG. 2, in order to ensure the accuracy of the placement position of the workpiece, the feeding line 21 includes a primary feeding assembly 211 and a plurality of secondary feeding assemblies 212. The primary feeding assembly 211 is fixed on the frame 10. The plurality of secondary feeding assemblies 212 is sequentially arranged on the frame 10. One end of the secondary feeding assembly 212 adjacent to the primary feeding assembly 211 is coupled to the primary feeding assembly 211. Each of the secondary feeding assemblies 212 is provided with a stopping assembly 213 for stopping the workpiece at a designated position. In one embodiment, there are four secondary feeding assemblies 212. In other embodiments, the number of secondary feeding assemblies 212 depends on the length of the feeding line 21 and the number of detection mechanisms 30.

Figure 3:
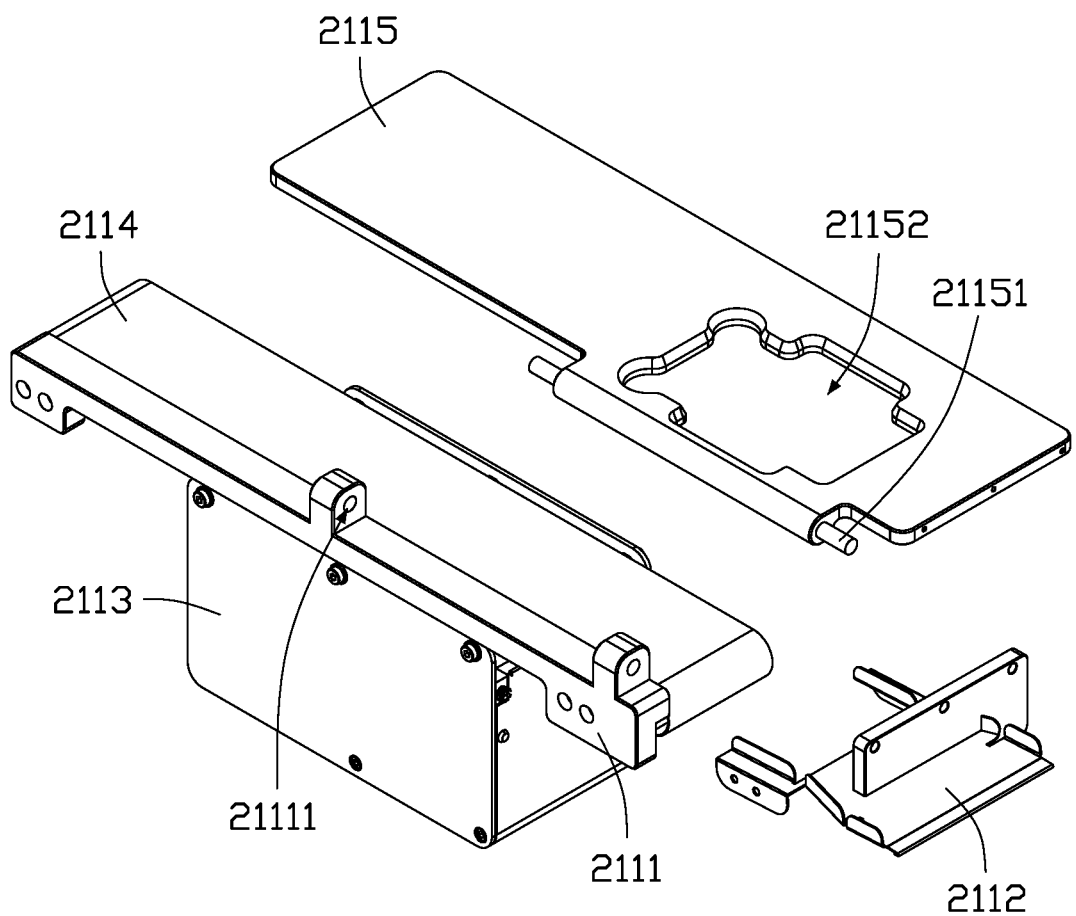
FIG. 3 is a perspective schematic diagram of a primary feeding assembly shown in FIG. 2.

Referring to FIG. 3, in order to facilitate placing the workpiece in a designated position, the primary feeding assembly 211 includes a mounting member 2111, a limiting member 2112, a first motor 2113, a first conveying member 2114, and a positioning member 2115. The mounting member 2111 is fixed to the frame 10. The limiting member 2112 is fixed to the mounting member 2111. The first motor 2113 is fixed to the mounting member 2111. The first conveying member 2114 is coupled to the first motor 2113. The positioning member 2115 is rotationally arranged on the mounting member 2111 and provided with a feeding slot 21152. The workpiece is passed through the feeding slot 21152 onto the first conveying member 2114.

The mounting member 2111 is used for carrying the limiting member 2112, the first motor 2113, and the positioning member 2115. In one embodiment, the mounting member 2111 is substantially a long bar. In other embodiments, the mounting member 2111 may be other structures.

Further, in order to facilitate the installation of the positioning member 2115, the mounting member 2111 is provided with an insertion hole 21111. The positioning member 2115 is disposed in the insertion hole 21111 and is rotationally coupled to the mounting member 2111. It can be understood that the fixing manner of the positioning member 2115 and the mounting member 2111 is not limited to this. In other embodiments, the positioning member 2115 and the mounting member 2111 may be hinge-coupled.

In order to prevent the workpiece from falling due to the reversal of the first conveying member 2114, the limiting member 2112 is fixed on the mounting member 2111 and located at the end of the first conveying member 2114. In one embodiment, the limiting member 2112 is a structure with two substantially perpendicular plates. It can be understood that the type of the limiting member 2112 is not limited to this, as in other embodiments, the limiting member 2112 may be a sheet-shaped stop plate or the like.

In order to prevent the workpiece from shaking on the secondary feeding assembly 212 during placement of the workpiece, the first conveying member 2114 is docked with the primary feeding assembly 211. It can be understood that the first conveying member 2114 may be a conveyor belt, but any mechanism that can convey the workpieces can be utilized.

In order to facilitate the installation of the positioning member 2115 and the mounting member 2111, the positioning member 2115 is provided with a rotating shaft 21151, and the rotating shaft 21151 is inserted into the insertion hole 21111. For placing the workpiece, the positioning member 2115 is rotated along the rotating shaft 21151 to be parallel to the first conveying member 2114, and the workpiece is placed on the first conveying member 2114 through the feeding slot 21152 to ensure accurate positioning of the workpiece.

A shape of the feeding slot 21152 matches a shape of the workpiece.

Referring to FIG. 2, in order to ensure smooth transportation of the workpiece, the secondary feeding assembly 212 includes a second motor 2121, a first rotating wheel 2122, a second rotating wheel 2123 and a second conveying member 2124. The second motor 2121 is fixed on the frame 10. Transmission shafts of the first rotating wheel 2122 and the second rotating wheel 2123 are fixed on the frame 10. The first rotating wheel 2122 is coupled to an output shaft of the second motor 2121. The second conveying member 2124 is sleeved on the first rotating wheel 2122 and the second rotating wheel 2123. The second motor 2121 drives the first rotating wheel 2122 and the second rotating wheel 2123 to rotate, so as to convey the second conveying member 2124 and the workpiece provided on the second conveying member 2124. In one embodiment, there are two groups of the secondary feeding assemblies 212. The two groups of secondary feeding assemblies 212 are arranged side-by-side, and there is a gap between the two groups of secondary feeding assemblies 212. In other embodiments, the number of the secondary feeding assemblies 212 is not limited to two. In other embodiments, there is only one secondary feeding assembly 212, and the secondary feeding assembly 212 is docked with the primary feeding assembly 211.

Figure 4:
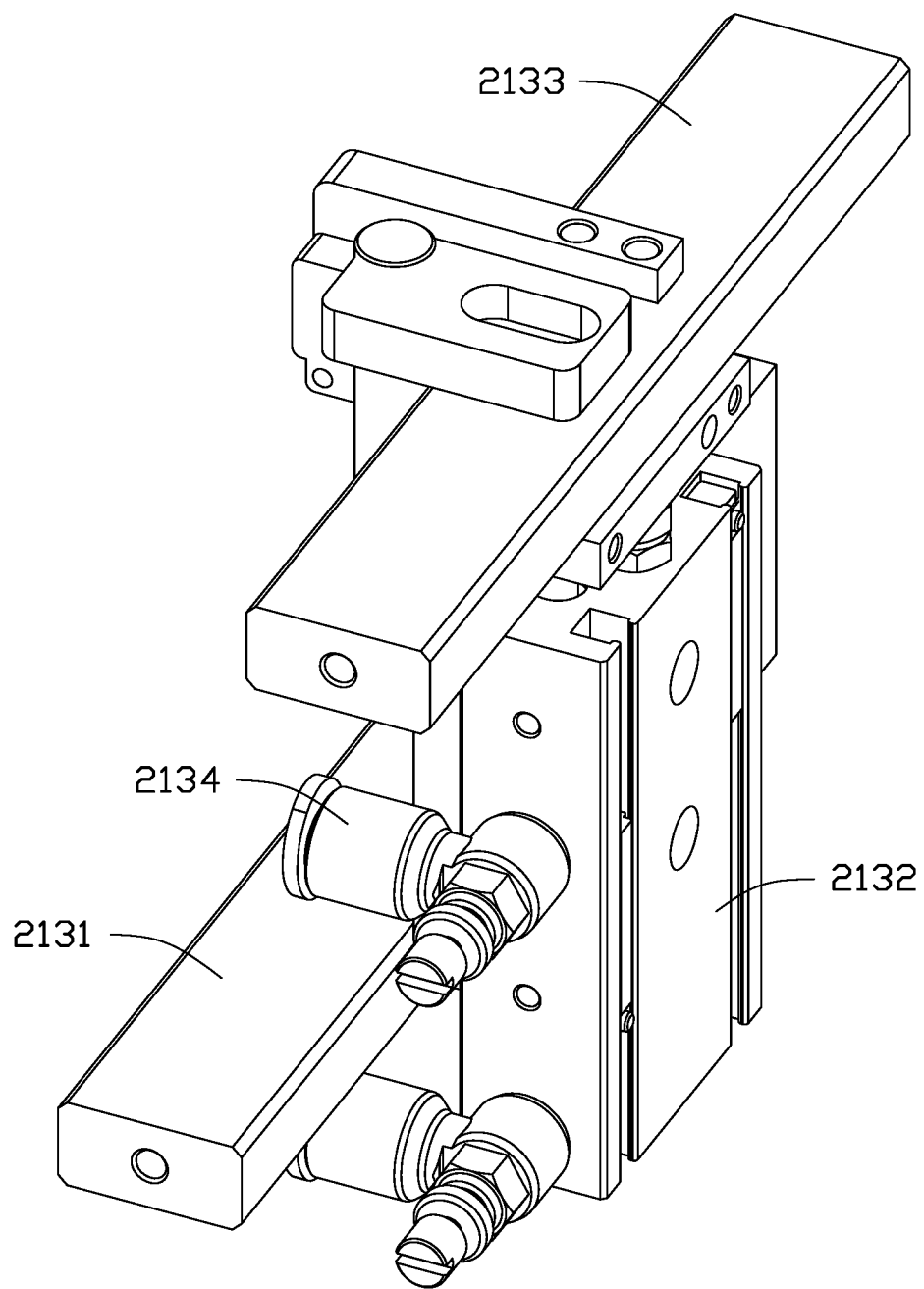
FIG. 4 is a perspective schematic diagram of a stopping assembly shown in FIG. 2.

Referring to FIG. 4, in order to ensure the accuracy of positioning the workpiece and prevent the workpiece from sliding on the second conveying member 2124, the stopping assembly 213 is arranged in the gap between the two secondary feeding assemblies 212 and used for holding the workpiece in a designated position without being affected by the secondary feeding assemblies 212.

Specifically, the stopping assembly 213 includes a fixed block 2131, a stopping cylinder 2132, a holding member 2133, and a first sensor 2134. The fixed block 2131 is fixed on the frame 10, the stopping cylinder 2132 is fixed on the fixed block 2131, the holding member 2133 is arranged at an output end of the stopping cylinder 2132, and the first sensor 2134 is arranged on an end surface of the stopping cylinder 2132 facing the workpiece. Before the grasping mechanism 40 grasps the workpiece, an electrical control system controls operation of the stopping cylinder 2132, thereby driving the holding member 2133 to extend upward to stop the workpiece in the gap between the two secondary feeding assemblies 212.

In one embodiment, the fixed block 2131 is substantially an "L"-shaped plate. In other embodiments, the fixed block 2131 is a prism plate or other structure.

In order to prevent the workpiece from shaking and causing the problem of low grasping accuracy when grasping the workpiece, the holding member 2133 is provided with a positioning structure (not shown). When the grasping mechanism 40 grasps the workpiece, the positioning structure abuts against a lower end of the workpiece to offset a vertical downward force exerted by the grasping mechanism 40 on the workpiece, thereby improving the accuracy of the workpiece position. In one embodiment, the positioning structure is a cylindrical rod. It can be understood that the type of the positioning structure is not limited to this, as in other embodiments, the positioning structure is a prismatic rod or the like.

In order to prevent the grasped workpiece from being missed, the first sensor 2134 is provided on one end surface of the stopping cylinder 2132 facing the workpiece. When the workpiece is transported to the secondary feeding assembly 212, the first sensor 2134 senses a proximity of the workpiece and sends feedback to the electrical control system. The electrical control system controls the operation of the stopping cylinder 2132, and the stopping cylinder 2132 drives the holding member 2133 to fix the position of the workpiece.

Figure 5:
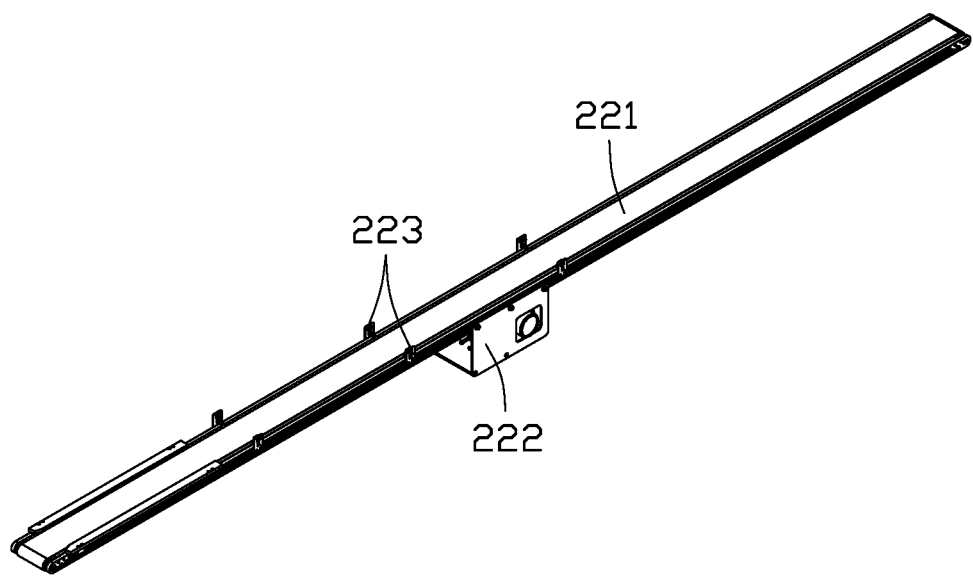
FIG. 5 is a perspective schematic diagram of a first flow line shown in FIG. 1.

Referring to FIG. 5, the first flow line 22 is used to transport the qualified workpiece to a next station for assembly. Specifically, the first flow line 22 includes a third conveying member 221, a third motor 222, and a second sensor 223. The third conveying member 221 is provided on the frame 10, the third motor 222 is provided on the third conveying member 221, and the second sensor 223 is provided on two opposite sides of the third conveying member 221. After the workpiece is qualified, the grasping mechanism 40 grasps and places the qualified workpiece on the first flow line 22. The second flow line 23 transports the qualified workpiece to the next station, and the second sensor 223 detects the qualified workpiece and transmits detection information of the qualified workpiece to a recording device for recording.

In one embodiment, the third conveying member 221 is a conveyor belt. It should be noted that the type of the third conveying member 221 is not limited to what is disclosed herein, and any structure or equipment that can transport the workpiece is acceptable.

In one embodiment, there are three sets of the second sensor 223, and each set of the second sensor 223 is arranged on opposite sides of the third conveying member 221. It can be understood that the number of the second sensor 223 is not limited to this, and the specific number is determined according to the length of the third conveying member 221.

Figure 6:
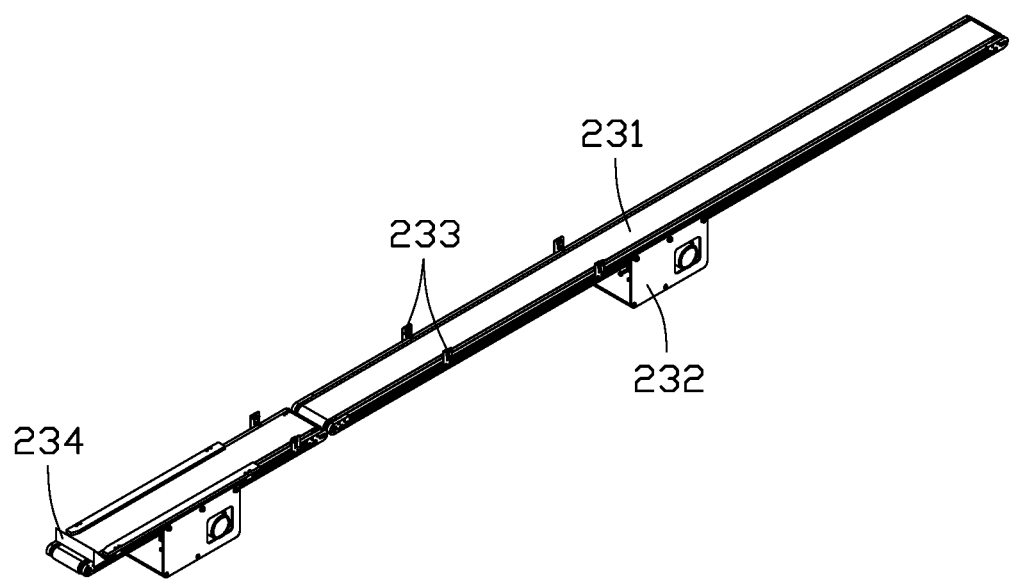
FIG. 6 is a perspective schematic diagram of a second flow line shown in FIG. 1.

Referring to FIG. 6, the second flow line 23 is used to transport the unqualified workpieces back to the feeding line 21. Specifically, the second flow line 23 includes a fourth conveying member 231, a fourth motor 232, a third sensor 233, and a stopping member 234. The fourth conveying member 231 is provided on the frame 10, the fourth motor 232 is provided on the fourth conveying member 231, the third sensor 233 is provided on two sides of the fourth conveying member 231, and the stopping member 234 is provided at one end of the fourth conveying member 231 adjacent to the primary feeding assembly 211. After the workpiece is unqualified, the grasping mechanism 40 grasps and places the unqualified workpiece onto the second flow line 23. The second flow line 23 transports the workpiece to the stopping member 234.

In one embodiment, the fourth conveying member 231 is a conveyor belt. It should be noted that the type of the fourth conveying member 231 is not limited to this, and any structure or equipment that can transport the workpiece is acceptable.

In one embodiment, there are three groups of the third sensor 233, and each group of the third sensor 233 is arranged on two sides of the fourth conveying member 231. It can be understood that the number of the third sensor 233 is not limited to this, and the specific number is determined according to the length of the fourth conveying member 231.

Figure 7:
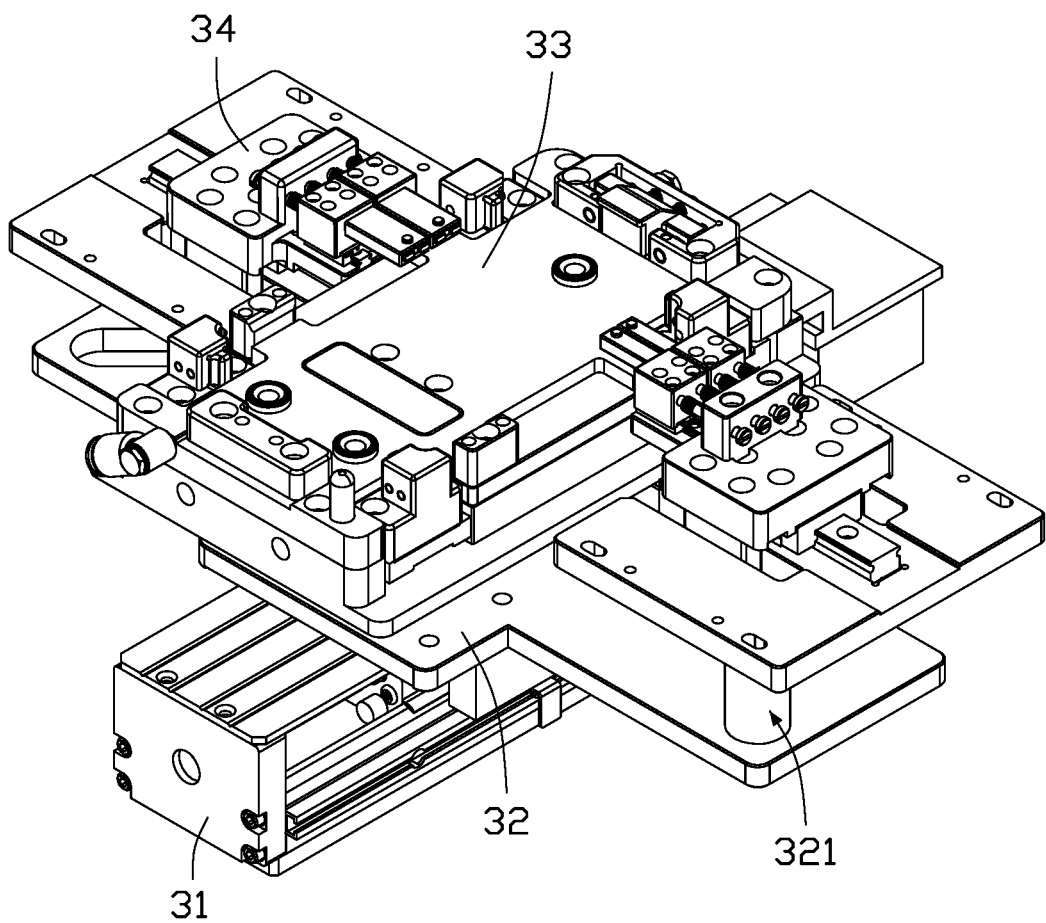
FIG. 7 is a perspective schematic diagram of a detection mechanism shown in FIG. 1.
Figure 8:
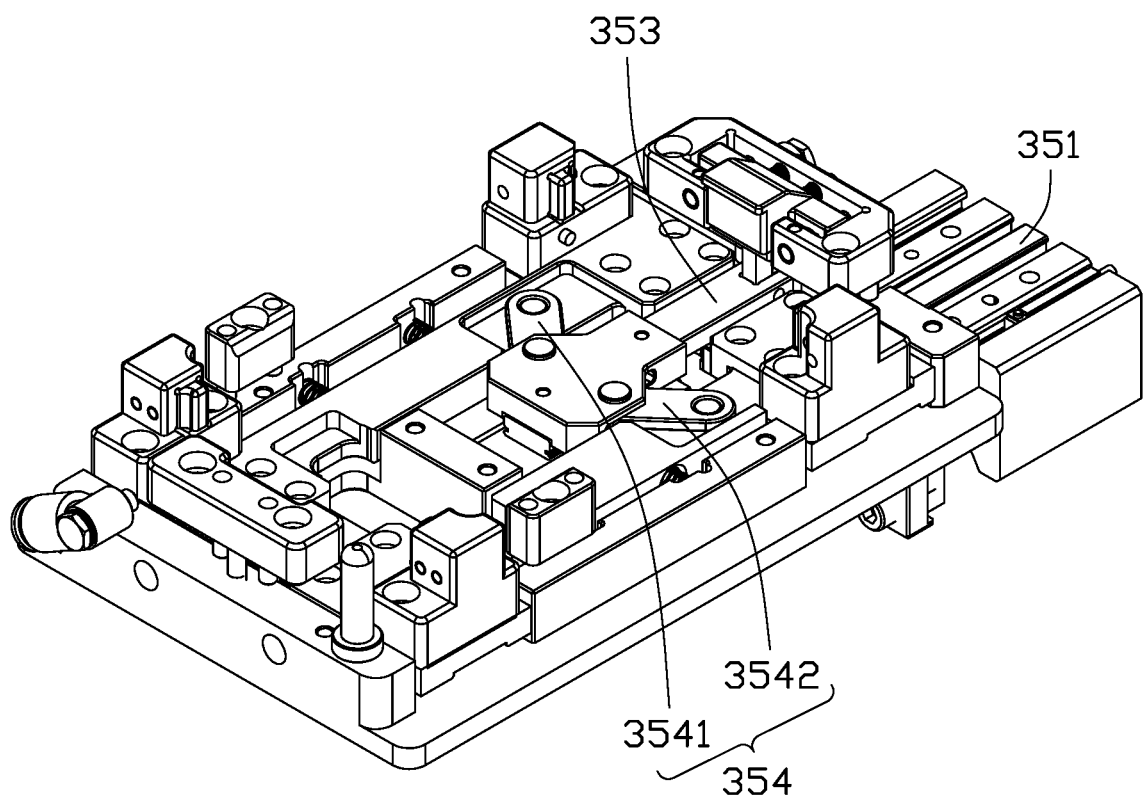
FIG. 8 is a perspective schematic diagram of a clamping unit shown in FIG. 1.

Referring to FIG. 7, in order to carry and detect the workpiece, the detection mechanism 30 includes a driving motor 31, a driving plate 32, a carrying unit 33, two pressing units 34, and a clamping unit 35 (shown in FIG. 8). The driving plate 32 is coupled to the driving motor 31. The carrying unit 33 is fixed on the driving plate 32. The two pressing units 34 are symmetrically arranged on two sides of the carrying unit 33, and the two pressing units 34 can be movably coupled to the driving plate 32. The clamping unit 35 is provided in the driving plate 32 and the carrying unit 33 and used for clamping the workpiece placed on the carrying unit 33.

The driving plate 32 is used to carry the carrying unit 33, the pressing units 34, and the clamping unit 35 and drive the pressing units 34 to compress the carrying unit 33.

In order to drive the clamping unit 35 to move, the driving plate 32 is provided with a transmission groove 321. When the driving motor 31 drives the clamping unit 35 to move, one end of the clamping unit 35 extends into the transmission groove 321, and the driving motor 31 drives the driving plate 32 to move, so that the clamping unit 35 moves along the transmission groove 321.

Figure 9:
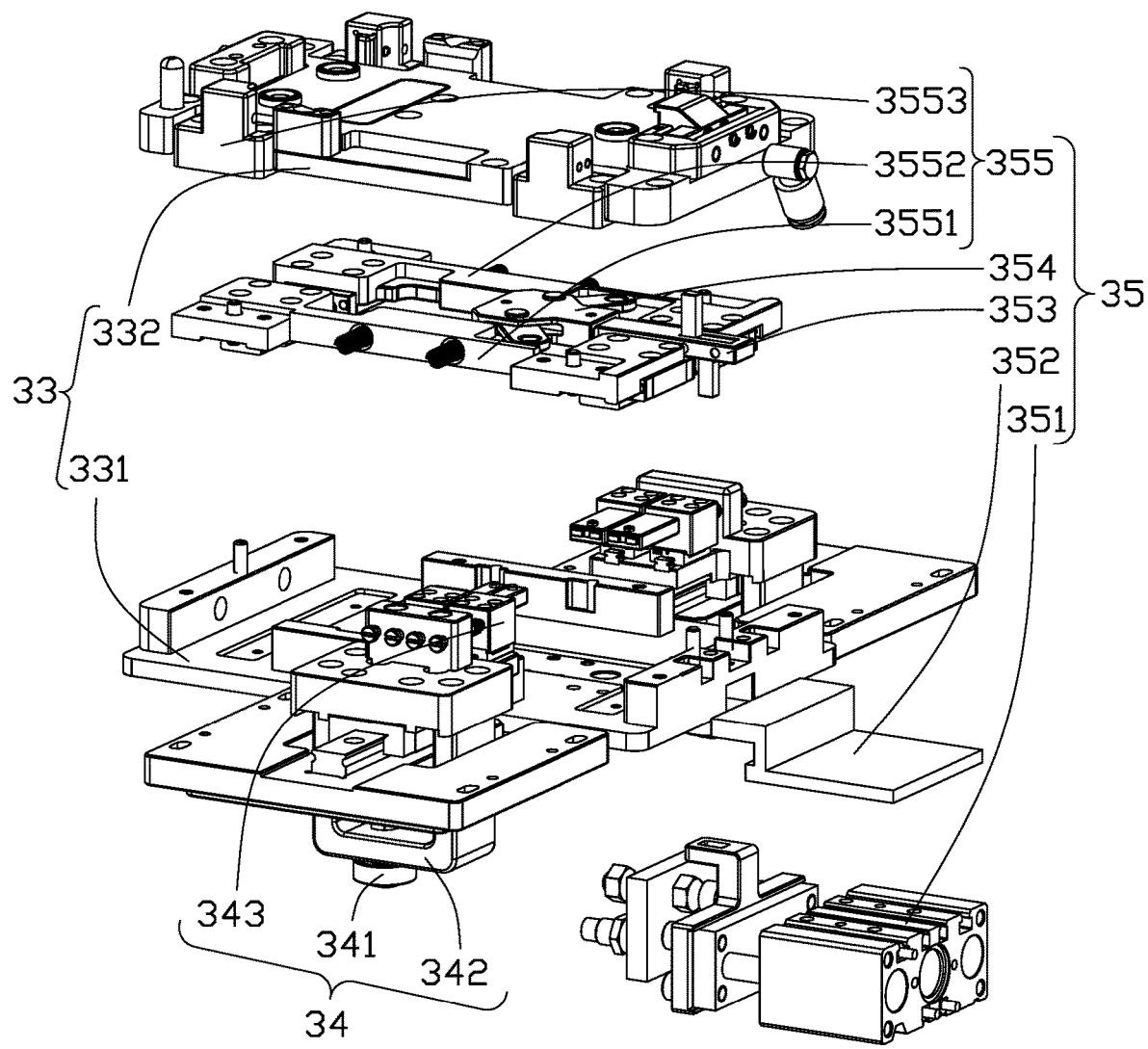
FIG. 9 is an exploded diagram of a carrying unit, a pressing unit, and a clamping unit shown in FIG. 1.

Referring to FIGS. 8 and 9, in order to fix the workpiece on the detection mechanism 30, the carrying unit 33 includes a base 331 and a fixing member 332. The base 331 is fixed on the detection mechanism 30. The fixing member 332 is stacked on the base 331, the workpiece is arranged on the fixing member 332, and the clamping unit 35 is arranged between the base 331 and the fixing member 332.

In order to facilitate the placement of the workpiece, a shape of the fixing member 332 is similar to a shape of the workpiece. In one embodiment, the shape of the fixing member 332 is rectangular.

Referring to FIG. 7, FIG. 8, and FIG. 9, each pressing unit 34 includes a cam 341, a connecting member 342, and a pressing member 343. The cam 341 is movably received in the transmission groove 321. The connecting member 342 is coupled to the cam 341. The pressing member 343 is arranged on the connecting member 342 and used for pressing the workpiece on the carrying unit 33.

In order to ensure the stability of operation of the pressing unit 34, a width of the cam 341 is substantially equal to a width of the transmission groove 321. When the pressing unit 34 moves, the cam 341 abuts against an inner wall of the transmission groove 321 to prevent the pressing unit 34 from shaking during movement.

In one embodiment, the connecting member 342 is a frame structure, and two ends of the connecting member 342 are respectively coupled to the cam 341 and the pressing member 343. In other embodiments, the connecting member 342 is a plate structure.

In one embodiment, when the pressing unit 34 presses the workpiece, the pressing member 343 extends and presses the workpiece on the base 331.

Referring to FIG. 8 and FIG. 9, in order to increase a stability of connection between the workpiece and the detection mechanism 30, the clamping unit 35 includes a clamping motor 351, a clamping plate 352, a transmission rod 353, a connecting rod assembly 354, and a clamping assembly 355. The clamping motor 351 is arranged on the driving plate 32. The clamping plate 352 is coupled to the clamping motor 351. The transmission rod 353 is arranged on the carrying unit 33. The connecting rod assembly 354 includes a first connecting rod 3541 and a second connecting rod 3542. The first connecting rod 3541 and the second connecting rod 3542 are hinge-coupled to the transmission rod 353, and the first connecting rod 3541 and the second connecting rod 3542 are respectively symmetrically arranged on two sides of the transmission rod 353. The clamping assembly 355 includes a first transmission block 3551 hinge-coupled to the first connecting rod 3541, a second transmission block 3552 hinge-coupled to the second connecting rod 3542, and a clamping member 3553 arranged on the first transmission block 3551 and the second transmission block 3552.

In order to transmit a driving force of the clamping motor 351 to the transmission rod 353, the clamping plate 352 is provided between the clamping motor 351 and the transmission rod 353. In one embodiment, the clamping plate 352 has a substantially "Z"-shaped cross-sectional structure. It can be understood that the shape of the clamping plate 352 is not limited to this. In other embodiments, the cross-sectional shape of the clamping plate 352 may be "L"-shaped.

One end of the transmission rod 353 is coupled to the clamping plate 352, and another end of the transmission rod 353 is hinge-coupled to the connecting rod assembly 354 to transmit power from the clamping motor 351 to the connecting rod assembly 354 and the clamping assembly 355 to clamp the workpiece on the fixing member 332.

In order to transmit the power from the clamping motor 351 to the clamping assembly 355, two ends of the first connecting rod 3541 are respectively hinge-coupled to the transmission rod 353 and the first transmission block 3551, and two ends of the second connecting rod 3542 are respectively hinge-coupled to the transmission rod 353 and the second transmission block 3552. When the clamping assembly 355 clamps the workpiece, the clamping motor 351 drives the transmission rod 353 to move away from the clamping motor 351, and the transmission rod 353 drives the first connecting rod 3541 and the second connecting rod 3542 to draw the clamping member 3553 inward to clamp the workpiece on the fixing member 332.

In order to reduce a volume of the carrying unit 33, the transmission rod 353 and the connecting rod assembly 354 are arranged between the first transmission block 3551 and the second transmission block 3552, so that when the workpiece is placed on the fixing member 332, the clamping member 3553 clamps the workpiece from both ends.

The first transmission block 3551 and the second transmission block 3552 are symmetrically arranged on the base 331 so as to drive the clamping member 3553 under the action of the first connecting rod 3541 and the second connecting rod 3542 to clamp the workpiece on the fixing member 332. In one embodiment, the first transmission block 3551 and the second transmission block 3552 are elongated block plates. It can be understood that the shapes of the first transmission block 3551 and the second transmission block 3552 are not limited to this, and any structure that can connect the first connecting rod 3541 and the second connecting rod 3542 is acceptable.

In one embodiment, there are four clamping members 3553, and the four clamping members 3553 are respectively fixed at four corners of the fixing member 332, and the four clamping members 3553 are fixed to the first transmission block 3551 and the second transmission block 3552. It is understandable that the number and positions of the clamping members 3553 are not limited to this. In other embodiments, there may be two clamping blocks 3553.

Figure 10:
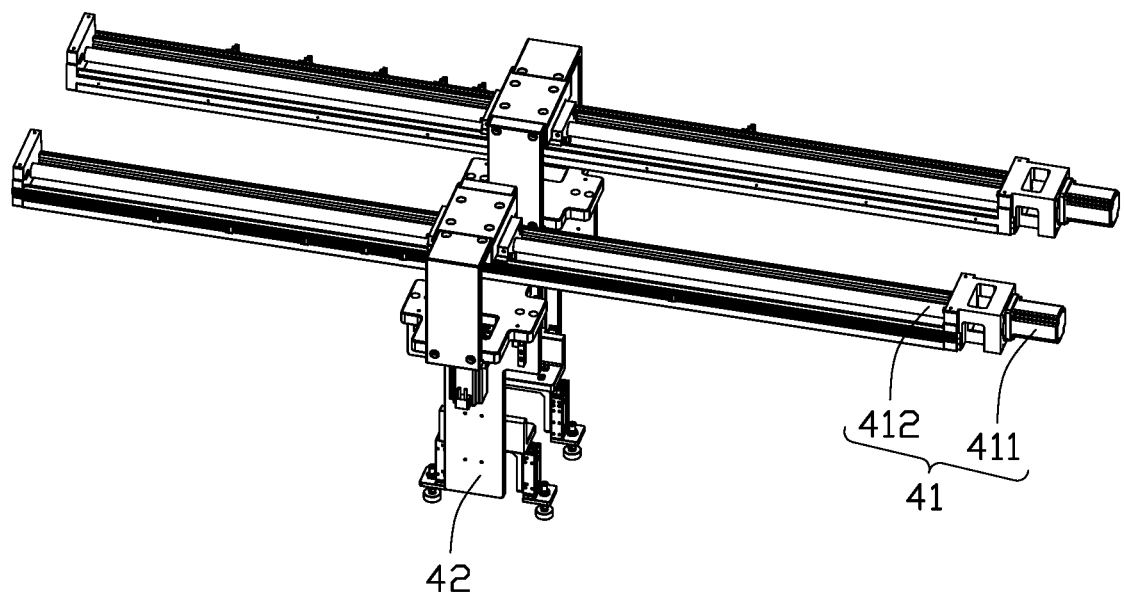
FIG. 10 is a perspective schematic diagram of a first movement unit and a second movement unit shown in FIG. 1.
Figure 11:
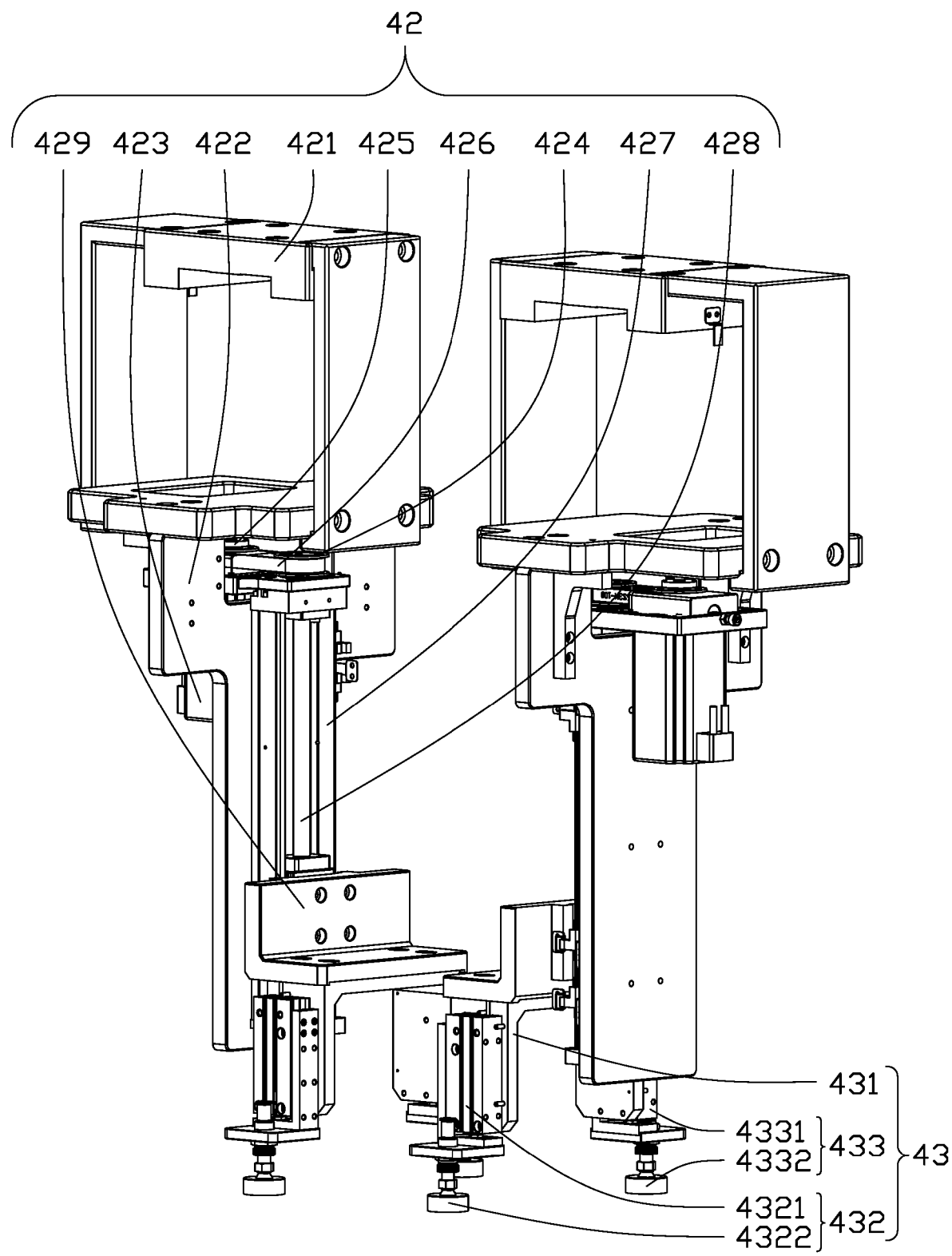
FIG. 11 is a perspective schematic diagram of the second movement unit shown in FIG. 10.

Referring to FIG. 10, the grasping mechanism 40 includes at least one first movement unit 41, at least one second movement unit 42, and at least one grasping unit 43 (shown in FIG. 11). The first movement unit 41 is fixed on the frame 10. The second movement unit 42 is arranged on the first movement unit 41. The grasping unit 43 is arranged on the second movement unit 42. The second movement unit 42 can drive the grasping unit 43 to move toward or away from the carrying unit 33.

In order to enable the grasping unit 43 to move between the two detection mechanisms 30, the first movement unit 41 includes a first movement motor 411 and a transmission shaft 412. The first movement motor 411 is coupled to the transmission shaft 412, and the second movement unit 42 is arranged on the transmission shaft 412.

Referring to FIG. 11, in order to move the grasping unit 43 toward or away from the detection mechanism 30, the second movement unit 42 includes a moving member 421, a fixing plate 422, a second movement motor 423, a third rotating wheel 424, a fourth rotating wheel 425, a fifth conveying member 426, a guide rail 427, a screw 428, and a sliding block 429. The moving member 421 is arranged on the first movement unit 41. An end of the moving member 421 is sleeved on the transmission shaft 412. The fixing plate 422 is fixed on the moving member 421. The second movement motor 423 is fixed on the fixing plate 422. The third rotating wheel 424 is coupled to an output shaft of the second movement motor 423. The fourth rotating wheel 425 is coupled to the screw 428. The fifth conveying member 426 is sleeved on the third rotating wheel 424 and the fourth rotating wheel 425. The guide rail 427 is fixed on the fixing plate 422. The screw 428 is located in the guide rail 427. The sliding block 429 is slidably arranged on the guide rail 427, and the sliding block 429 is sleeved on the screw 428.

In one embodiment, the moving member 421 is a hollow rectangular frame. In other embodiments, the moving member 421 may be a sheet-like plate or other structure.

In one embodiment, the fifth conveying member 426 is a conveyor belt. It can be understood that the fifth conveying member 426 is not limited to this, and any structure or device that can connect the second movement motor 423 and the screw 428 and drive the screw 428 to rotate can be used.

Referring to FIG. 10, in order to facilitate grasping the workpiece, the grasping unit 43 includes a connecting plate 431, a first grasping component 432 and a second grasping component 433. The connecting plate 431 is fixed on the sliding block 429, and the first grasping component 432 and the second grasping component 433 are respectively symmetrically arranged on two sides of the connecting plate 431.

In one embodiment, the connecting plate 431 is substantially a "U"-shaped structure. In other embodiments, the connecting plate 431 may be a hollow rectangular structure.

The first grasping component 432 includes a first grasping cylinder 4321 and a first suction claw 4322. The first grasping cylinder 4321 is fixed on the connecting plate 431, and the first suction claw 4322 is provided at an output end of the first grasping cylinder 4321 and is driven by the first grasping cylinder 4321 to move toward or away from the detection mechanism 30.

In order to grasp two workpieces at the same time to improve efficiency, the second grasping component 433 includes a second grasping cylinder 4331 and a second suction claw 4332. The second grasping cylinder 4331 is arranged on the connecting plate 431. The second grasping cylinder 4331 is arranged directly opposite to the first grasping cylinder 4321. The second suction claw 4332 is arranged on an output end of the second grasping cylinder 4331. When the grasping unit 43 grasps the workpiece, the first grasping component 432 is used to transfer the workpiece from the feeding line 21 to the plurality of detection mechanisms 30, and the second grasping component 433 is used to transfer the qualified or unqualified workpiece to the first flow line 22 or the second flow line 23, respectively.

In use, the workpiece to be detected is placed on the first conveying member 2114 through the feeding slot 21152. At this time, the first motor 2113 drives the first conveying member 2114 to convey the workpiece. The workpiece is transported to the second conveying member 2124. The workpiece is transported on the second conveying member 2124 until the first sensor 2134 senses the workpiece and controls the stopping cylinder 2132 to drive the holding member 2133 to extend between the two secondary feeding assemblies 212. The holding member 2133 abuts on the workpiece to hold the workpiece.

After receiving the signal from the electrical control system, the first movement motor 411 drives the transmission shaft 412 to rotate, and the transmission shaft 412 drives the second movement unit 42 to move to above the workpiece to be detected. At this time, the second movement motor 423 drives the third rotating wheel 424 and the fourth rotating wheel 425 to rotate, thereby driving the fifth conveying member 426 to convey on the third rotating wheel 424 and the fourth rotating wheel 425. The third rotating wheel 424 drives the screw 428 to rotate, and the sliding block 429 moves on the guide rail 427 and the screw 428 in a direction toward the detection mechanism 30 to transport the grasping unit 43 to a designated position.

The electrical control system controls the first grasping cylinder 4321 to extend and drive the first suction claw 4322 to move toward the workpiece to suck the workpiece. After the workpiece is sucked, the first grasping cylinder 4321 contracts and is driven by the first movement motor 411 to move along the transmission shaft 412 to the detection mechanism 30. At this time, the first grasping cylinder 4321 drives the first suction claw 4322 to move to a designated position. Then, the first suction claw 4322 is turned off, and the workpiece is placed on the fixing member 332.

The driving motor 31 drives the driving plate 32 to move. The cam 341 is received in the transmission groove 321 and is driven by the driving plate 32 to move toward the workpiece. The cam 341 drives the pressing member 343 to move toward the workpiece until the workpiece is pressed. At this time, the clamping motor 351 drives the transmission rod 353 to move away from the clamping motor 351 between the first transmission block 3551 and the second transmission block 3552 and drive the first connecting rod 3541 and the second connecting rod 3542 to move. The first connecting rod 3541 and the second connecting rod 3542 drive the first transmission block 3551 and the second transmission block 3552 to move toward the workpiece until the clamping member 3553 located on the first transmission block 3551 and the second transmission block 3551 clamps the workpiece.

Then, the second movement unit 42 moves along the transmission shaft 412 to the feeding line 21 again, and the first suction claw 4322 sucks the workpiece again. The second grasping component 433 moves on the transmission shaft 412 and the screw 428 to the fixing member 332, and the second grasping cylinder 4331 drives the second suction claw 4332 to extend and grasp the inspected workpiece. At this time, the first suction claw 4322 puts the sucked workpiece to be inspected on the fixing member 332, and the detection mechanism 30 clamps the workpiece to be inspected. The first suction claw 4322 transfers the qualified workpiece to the first flow line 22 to flow into the next station for assembly. The first suction claw 4322 transfers the unqualified workpiece to the second flow line 23 to return to the primary feeding assembly 211.

The detection device 100 provided above divides the transport mechanism 20 into the feeding line 21, the first flow line 22, and the second flow line 23. The workpieces to be inspected are grasped from the feeding line 21 and placed on the inspection mechanism 30. The qualified workpiece is grasped and placed onto the first flow line 22 to flow into the next station for assembly. The unqualified workpiece is grasped and placed onto the second flow line 23 to be transported back to the starting point. Therefore, automatic grasping and inspection of the workpieces is realized, thereby reducing labor costs and improving efficiency.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A detection device comprising:
a frame;
a transport mechanism comprising a feeding line, a first flow line, and a second flow line arranged in parallel on the frame;
a plurality of detection mechanisms arranged on the frame and located on two sides of the transport mechanism; and
a grasping mechanism arranged on the frame and configured to transport workpieces on the feeding line to the plurality of detection mechanisms, and transport qualified workpieces to the first flow line, and transport unqualified workpieces to the second flow line;
the feeding line comprises a primary feeding assembly, a plurality of secondary feeding assemblies, and a stopping assembly;
the primary feeding assembly is fixed on the frame;
the plurality of secondary feeding assemblies is sequentially arranged on the frame, and one end of the secondary feeding assembly adjacent to the primary feeding assembly is coupled to the primary feeding assembly; and
the stopping assembly is arranged on the frame and configured to stop the workpiece at a designated position;
the primary feeding assembly comprises a mounting member, a limiting member, a first motor, a first conveying member, and a positioning member;
the mounting member is fixed on the frame;
the limiting member is fixed on the mounting member;
the first motor is fixed on the mounting member;
the first conveying member is coupled to the first motor;
the positioning member is rotationally arranged on the mounting member, and the positioning member is provided with a feeding slot; and
the first conveying member receives the workpiece through the feeding slot.

2. The detection device of claim 1, wherein:
a rotating shaft is provided on the positioning member;
an insertion hole is provided on the mounting member; and
the rotating shaft is arranged in the insertion hole.

3. The detection device of claim 1, wherein:
the detection mechanism comprises a driving motor, a driving plate, a carrying unit, two pressing units, and a clamping unit;
the driving plate is coupled to the driving motor;
the carrying unit is fixed on the driving plate;
the two pressing units are respectively symmetrically arranged on two sides of the carrying unit, and the two pressing units are movably coupled to the driving plate; and
the clamping unit is arranged in the driving plate and the carrying unit and configured for clamping the workpiece placed on the carrying unit.

4. The detection device of claim 3, wherein:
the carrying unit comprises a base and a fixing plate;
the base is fixed on the detection mechanism;
the fixing plate is stacked on the base; and
the clamping unit is arranged between the base and the fixing plate.

5. The detection device of claim 3, wherein:
each of the pressing units comprises a cam, a connecting member, and a pressing member;
a transmission groove is provided on the driving plate, and the cam is movably received in the transmission groove;

the connecting member is coupled to the cam; and the pressing member is arranged on the connecting member and configured for pressing the workpiece on the carrying unit.

6. The detection device of claim 3, wherein:

the clamping unit comprises a clamping motor, a clamping plate, a transmission rod, a connecting rod assembly, and a clamping assembly;

the clamping motor is arranged on the driving plate;

the clamping plate is coupled to the clamping motor;

the transmission rod is arranged on the carrying unit;

the connecting rod assembly comprises a first connecting rod and a second connecting rod, each of the first connecting rod and the second connecting rod is hinge-coupled to the transmission rod, and the first connecting rod and the second connecting rod are respectively and symmetrically arranged on two sides of the transmission rod; and the clamping assembly comprises a first transmission block hinge-coupled to the first connecting rod, a second transmission block hinge-coupled to the second connecting rod, and a clamping member arranged on the first transmission block and the second transmission block.

7. The detection device of claim 1, wherein:

the grasping mechanism comprises a first movement unit, a second movement unit, and a grasping unit;

the first movement unit is fixed on the frame;

the second movement unit is arranged on the first movement unit; and the grasping unit is arranged on the second movement unit, the second movement unit is configured to drive the grasping unit to move in a direction toward or away from the transport mechanism.

8. The detection device of claim 7, wherein:

the grasping unit comprises a connecting plate, a first grasping component, and a second grasping component;

the connecting plate is fixed on the second movement unit;

the first grasping component comprises a first grasping cylinder on the connecting plate and a first suction claw on a driving end of the first grasping cylinder; and the second grasping component comprises a second grasping cylinder on the connecting plate and a second suction claw on a driving end of the second grasping cylinder.

9. The detection device of claim 8, wherein:

the first grasping component and the second grasping component are respectively and symmetrically arranged on two sides of the connecting plate.

10. A detection device comprising:

a frame;

a transport mechanism comprising a feeding line, a first flow line, and a second flow line;

a plurality of detection mechanisms arranged on the frame and located on two sides of the transport mechanism, the plurality of detection mechanisms being arranged in pairs along the transport mechanism; and a grasping mechanism arranged on the frame and configured to transport workpieces on the feeding line to the plurality of detection mechanisms, and transport qualified workpieces to the first flow line, and transport unqualified workpieces to the second flow line;

the feeding line comprises a primary feeding assembly, a plurality of secondary feeding assemblies, and a stopping assembly;

the primary feeding assembly is fixed on the frame;

the plurality of secondary feeding assemblies is sequentially arranged on the frame, and one end of the secondary feeding assembly adjacent to the primary feeding assembly is coupled to the primary feeding assembly; and the stopping assembly is arranged on the frame and configured to stop the workpiece at a designated position;

the primary feeding assembly comprises a mounting member, a limiting member, a first motor, a first conveying member, and a positioning member;

the mounting member is fixed on the frame;

the limiting member is fixed on the mounting member;

the first motor is fixed on the mounting member;

the first conveying member is coupled to the first motor;

the positioning member is rotationally arranged on the mounting member, and the positioning member is provided with a feeding slot; and the first conveying member receives the workpiece through the feeding slot.

11. The detection device of claim 1, wherein:

the stopping assembly is arranged in the gap between the two adjacent secondary feeding assemblies.

12. The detection device of claim 1, wherein:

the limiting member is fixed on the mounting member and located at the end of the first conveying member.

13. The detection device of claim 5, wherein:

a width of the cam is equal to a width of the transmission groove.

14. The detection device of claim 6, wherein:

the transmission rod and the connecting rod assembly are arranged between the first transmission block and the second transmission block.

15. The detection device of claim 1, wherein:

a plurality of the grasping mechanisms are provided, the plurality of detection mechanisms are symmetrically arranged on two sides of the transport mechanism, and the plurality of grasping mechanisms are arranged side-by-side on the detection mechanisms and the transport mechanism, and each of the grasping mechanisms is located on each group of detection mechanisms.

* * * * *